US010816998B2

(12) United States Patent
Lee

(10) Patent No.: US 10,816,998 B2
(45) Date of Patent: Oct. 27, 2020

(54) AIRPLANE TAKEOFF TRIMS UTILIZING BOTH STABILIZERS AND ELEVATORS

(71) Applicant: The Boeing Company, Chicago, IL (US)

(72) Inventor: Jonathan P. Lee, Everett, WA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 15/707,368

(22) Filed: Sep. 18, 2017

(65) Prior Publication Data

US 2019/0086937 A1 Mar. 21, 2019

(51) Int. Cl.
| | |
|---|---|
| *G05D 1/08* | (2006.01) |
| *G01D 1/06* | (2006.01) |
| *B64C 13/16* | (2006.01) |
| *B64C 13/50* | (2006.01) |
| *B64C 13/04* | (2006.01) |
| *B64C 5/02* | (2006.01) |
| *G05D 1/00* | (2006.01) |
| *B64C 5/10* | (2006.01) |
| *B64C 13/08* | (2006.01) |
| *B64C 9/00* | (2006.01) |
| *G05D 1/06* | (2006.01) |

(52) U.S. Cl.
CPC .............. *G05D 1/0816* (2013.01); *B64C 5/02* (2013.01); *B64C 5/10* (2013.01); *B64C 13/0427* (2018.01); *B64C 13/08* (2013.01); *B64C 13/16* (2013.01); *B64C 13/503* (2013.01); *G05D 1/0083* (2013.01); *G05D 1/0653* (2013.01); *G05D 1/0661* (2013.01); *B64C 9/00* (2013.01)

(58) Field of Classification Search
None
See application file for complete search history.

(56) References Cited

U.S. PATENT DOCUMENTS 3,578,268 A * 5/1971 Kramer ................ G05D 1/0808
244/178
4,006,871 A 2/1977 Simpson
(Continued)

FOREIGN PATENT DOCUMENTS

EP 2944566 A1 11/2015

OTHER PUBLICATIONS

"European Application Serial No. 18180943.5, Search Report dated Dec. 20, 2018", 8 pgs.
(Continued)

*Primary Examiner* — Navid Ziaeianmehdizadeh
(74) *Attorney, Agent, or Firm* — Kwan & Olynick LLP

(57) ABSTRACT

Provided are airplane trim systems and methods of controlling such systems. These systems utilize smaller portions of the stabilizer total travel range for takeoff trims, in comparison to other trim systems. A trim system described includes stabilizer and elevator, and these components are used together to achieved a takeoff total tail pitching moment. The elevator or, at least a portion of the elevator operating range, is available for flight control. As such, takeoff trim settings include stabilizer and elevator orientation settings. Addition of the elevator to control the takeoff tail pitching moment allows reducing the stabilizer total travel. The elevator orientation can be changed much faster than that of the stabilizer providing pilot more control.

20 Claims, 8 Drawing Sheets

(56) References Cited

U.S. PATENT DOCUMENTS

| | | | |
|---|---|---|---|
| 4,042,197 A | 8/1977 | Boyle et al. | |
| 4,419,732 A | 12/1983 | Lambregts et al. | |
| 4,825,375 A * | 4/1989 | Nadkarni | G05D 1/0607 244/178 |
| 5,036,469 A | 7/1991 | Pelton | |
| 5,446,666 A | 8/1995 | Bauer | |
| 5,692,708 A * | 12/1997 | Coleman | G05D 1/0816 244/178 |
| 5,722,620 A | 3/1998 | Najmabadi et al. | |
| 5,823,479 A | 10/1998 | Nield et al. | |
| 5,979,835 A | 11/1999 | Najmabadi et al. | |
| 6,325,333 B1 | 12/2001 | Najmabadi et al. | |
| 6,422,517 B1 | 7/2002 | DeWitt et al. | |
| 6,761,336 B2 | 7/2004 | DeWitt et al. | |
| 7,264,201 B2 * | 9/2007 | Boe | B64C 5/02 244/75.1 |
| 8,489,257 B2 * | 7/2013 | Holzhausen | B64C 9/04 244/178 |
| 8,718,839 B2 * | 5/2014 | Everett | B64C 13/08 244/178 |
| 8,781,653 B2 | 7/2014 | Buchholz et al. | |
| 8,996,205 B2 * | 3/2015 | Pierre | G05D 1/0066 244/174 |
| 9,731,813 B2 | 8/2017 | Moore et al. | |
| 9,878,776 B2 * | 1/2018 | Mahmulyin | B64C 13/16 |
| 2005/0178899 A1 * | 8/2005 | Boe | B64C 5/02 244/93 |
| 2005/0218262 A1 * | 10/2005 | Boe | B64C 13/16 244/87 |
| 2005/0242235 A1 * | 11/2005 | Delaplace | G05D 1/0083 244/75.1 |
| 2006/0060699 A1 * | 3/2006 | Boe | B64C 5/02 244/87 |
| 2006/0144996 A1 * | 7/2006 | Carl | B64C 5/10 244/99.2 |
| 2008/0188999 A1 * | 8/2008 | Mathieu | G05D 1/0083 701/7 |
| 2010/0222944 A1 * | 9/2010 | Blechen | G05D 1/0623 701/6 |
| 2012/0205490 A1 * | 8/2012 | Whitehouse | B64C 5/02 244/89 |
| 2013/0175392 A1 | 7/2013 | Buchholz et al. | |
| 2016/0200419 A1 * | 7/2016 | Moore | B64C 13/16 701/4 |
| 2016/0325821 A1 * | 11/2016 | Golshany | B64C 1/26 |
| 2017/0370786 A1 * | 12/2017 | Mastrianni | G01B 11/16 |
| 2018/0037313 A1 * | 2/2018 | Harden | B64C 5/02 |
| 2018/0086431 A1 * | 3/2018 | Beaufrere | B64C 5/10 |
| 2019/0003853 A1 * | 1/2019 | Tremblay | G01C 23/005 |
| 2019/0047683 A1 * | 2/2019 | De Souza | B64C 13/503 |

OTHER PUBLICATIONS

"European Application Serial No. 18180943.5, Office Action dated Nov. 21, 2019", 5 pgs.

* cited by examiner

AIRPLANE TAKEOFF TRIMS UTILIZING BOTH STABILIZERS AND ELEVATORS

BACKGROUND

An airplane with a movable horizontal stabilizer utilizes an appropriate orientation (e.g., an angle) of the stabilizer for a takeoff. This orientation is also known as a takeoff trim stabilizer setting and corresponds to a tail total pitching moment. These characteristics may include completing the climb-out without retrimming and/or having a certain pitch rate response on takeoff rotation for a given pilot control input. The takeoff trim stabilizer setting may depend on various parameters, such as the airplane weight, center of gravity (CG), takeoff thrust setting, takeoff flap angle, and the like. Prior to the takeoff, the takeoff trim stabilizer setting may be determined based on the airplane loading manifest information as well as the pilot's selection of the flap angle and takeoff thrust setting. A large portion of the stabilizer total travel range may be used to accommodate possible takeoff conditions, particularly for airplanes with large ranges of possible takeoff loadings, flap angles, and thrust settings.

New methods and systems, which utilize smaller portions of the stabilizer total travel range, have been developed.

SUMMARY

Provided are airplane trim systems and methods of controlling such systems. These systems utilize smaller portions of the horizontal stabilizer total travel range for takeoff trim settings, in comparison to other trim systems. A trim system described includes stabilizer and elevator, and these components are used together to achieve a takeoff total tail pitching moment. The elevator or, at least a portion of the elevator operating range, is available for flight control. As such, takeoff trim settings include stabilizer and elevator orientation settings. Addition of the elevator to control the takeoff tail pitching moment allows reducing the stabilizer total travel. The elevator orientation can be changed much faster than that of the stabilizer providing pilot more control.

In some embodiments, a method of controlling a trim system of an airplane comprises determining the takeoff trim settings for a takeoff based on airplane takeoff parameters. The takeoff trim settings comprise a stabilizer orientation setting and an elevator orientation setting. The airplane takeoff parameters comprise at least one parameter selected from one of an airplane weight, an airplane center of gravity, a takeoff flap setting, or a takeoff thrust setting. The method then proceeds with adjusting the orientation of the stabilizer of the airplane using a stabilizer orientation mechanism and in accordance with the stabilizer orientation setting of the takeoff trim settings. The method also involves adjusting the orientation of an elevator of the airplane using an elevator orientation mechanism and in accordance with the elevator orientation setting of the takeoff trim settings.

The elevator orientation setting of the takeoff trim settings may be different from a neutral orientation of the elevator. Alternatively, the stabilizer orientation setting may be selected such that the elevator orientation setting corresponds to its neutral orientation.

The stabilizer orientation setting and the elevator orientation setting of the takeoff trim settings are interdependent. In other words, the stabilizer orientation setting and the elevator orientation setting of the takeoff trim settings depend on each other. Specifically, determining the trim takeoff settings may comprise determining the stabilizer orientation setting based on the elevator orientation setting. In these embodiments, determining the stabilizer orientation setting may comprises: (a) selecting an initial elevator orientation setting; (b) determining an initial stabilizer orientation setting based on the initial elevator orientation setting; (c) comparing the initial stabilizer orientation setting to operational conditions; and (d) selecting the initial elevator orientation setting as the elevator orientation setting and the initial stabilizer orientation setting as the stabilizer orientation setting.

The initial elevator orientation setting may be a takeoff limit of an elevator takeoff sub-range, with the elevator takeoff sub-range being a portion of an elevator total operating range. The elevator total operating range further comprises one or more flight control margins, the elevator takeoff sub-range is set based on flight control operability of the elevator. Alternatively, the initial elevator orientation setting is a neutral orientation of the elevator.

In some embodiments, selecting the initial elevator orientation setting, determining the initial stabilizer orientation setting, and comparing the initial stabilizer orientation setting to the operational conditions are repeated until the initial stabilizer orientation setting is within a set threshold from an average of the operational conditions. Alternatively, these operations may be repeated until the initial elevator orientation setting is within a set threshold from the neutral orientation while the initial stabilizer orientation setting is within the operational conditions.

In some embodiments, the method further comprises reducing the elevator control bias in a flight control system. For purposes of this disclosure, the elevator control bias is defined as a condition when the elevator orientation setting of the takeoff trim settings does not correspond to the neutral orientation of the elevator. The elevator orientation setting of the takeoff trim settings may be also referred to as an elevator orientation takeoff setting. The bias is cause by the fact that this elevator orientation takeoff setting is a part of the takeoff trim settings and not part of the flight control input. As such, the operation is performed if the elevator orientation setting is different from the neutral orientation. In some embodiments, the flight control system may be a fly-by-wire system.

In some embodiments, determining the takeoff trim settings is performed using a database. In some embodiments, the method further comprises initiating the takeoff of the airplane with the orientation of the stabilizer in accordance with the stabilizer orientation setting and with the orientation of the elevator in accordance with the elevator orientation setting. In these embodiments, the method may further comprise changing the orientation of the stabilizer after the takeoff until a neutral orientation of the elevator orientation mechanism corresponds to a neutral orientation of the elevator. In other words, the trim settings may be changed after the takeoff such that the elevator bias associated with the takeoff is reduced to a set level or eliminated.

In some embodiments, at least one of the elevator orientation mechanism or the stabilizer orientation mechanism is electronically controlled. The electronic control allows changing the elevator orientation for the takeoff with no bias or reduced bias introduced into the pilot controls.

In some embodiments, the stabilizer orientation mechanism is automatically controlled by a trim controller directly providing the stabilizer orientation setting and the elevator orientation setting to the stabilizer orientation mechanism.

In some embodiments, a trim system of an airplane comprises a trim controller, a stabilizer orientation mechanism, a stabilizer, elevator orientation mechanism, and an elevator. The trim controller is operable to determine trim settings for a takeoff of the airplane based on airplane takeoff parameters. For example, the takeoff trim settings may comprise a stabilizer orientation setting and an elevator orientation setting. The airplane takeoff parameters may comprise at least one parameter selected from one of an airplane weight, an airplane center of gravity, an airplane flap setting, or an airplane takeoff thrust setting. The stabilizer orientation mechanism is controllable based on the stabilizer orientation setting. The stabilizer is mechanically coupled to the stabilizer orientation mechanism. The stabilizer orientation mechanism is operable to change the orientation of the stabilizer based on the stabilizer orientation setting. The elevator orientation mechanism is controllable based on the elevator orientation setting. The elevator is mechanically coupled to the elevator orientation mechanism. Furthermore, the elevator orientation mechanism is operable to change orientation of the elevator based on the elevator orientation setting.

In some embodiments, the trim controller is communicatively coupled to at least one of the stabilizer orientation mechanism or the elevator orientation mechanism. The trim controller may be operable to receive the elevator orientation setting from a flight controller and to determine the stabilizer orientation setting based on the elevator orientation setting received from the flight controller.

The features and functions that have been discussed can be achieved independently in various examples or may be combined in yet other examples further details of which can be seen with reference to the following description and drawings.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Many airplanes, in particular airliners, have tailplanes with an adjustable angle of incidence, which may be also referred to as movable horizontal stabilizers. A certain stabilizer angle is used for a takeoff and it may be referred to as a takeoff trim stabilizer setting or simply a stabilizer orientation setting. This stabilizer angle or, more generally, the stabilizer orientation is a part of the takeoff trim settings. Furthermore, the stabilizer angle may change during the flight, for example, as the fuel is burned and the airplane center of gravity changes.

Unlike other trim systems, in which the stabilizer angle is the main factor and often the only factor determining the tail total airplane pitching moment, trim systems described herein utilize a combination of a stabilizer and an elevator to generate an appropriate pitching moment. In other words, the stabilizer orientation and the elevator orientation are both parts of the takeoff trim. As such, takeoff trim settings described herein comprise at least a stabilizer orientation setting and an elevator orientation setting. Due to the additional effect of the elevator during the takeoff, the stabilizer travel range can be significantly reduced, in comparison to other systems.

Figure 1:
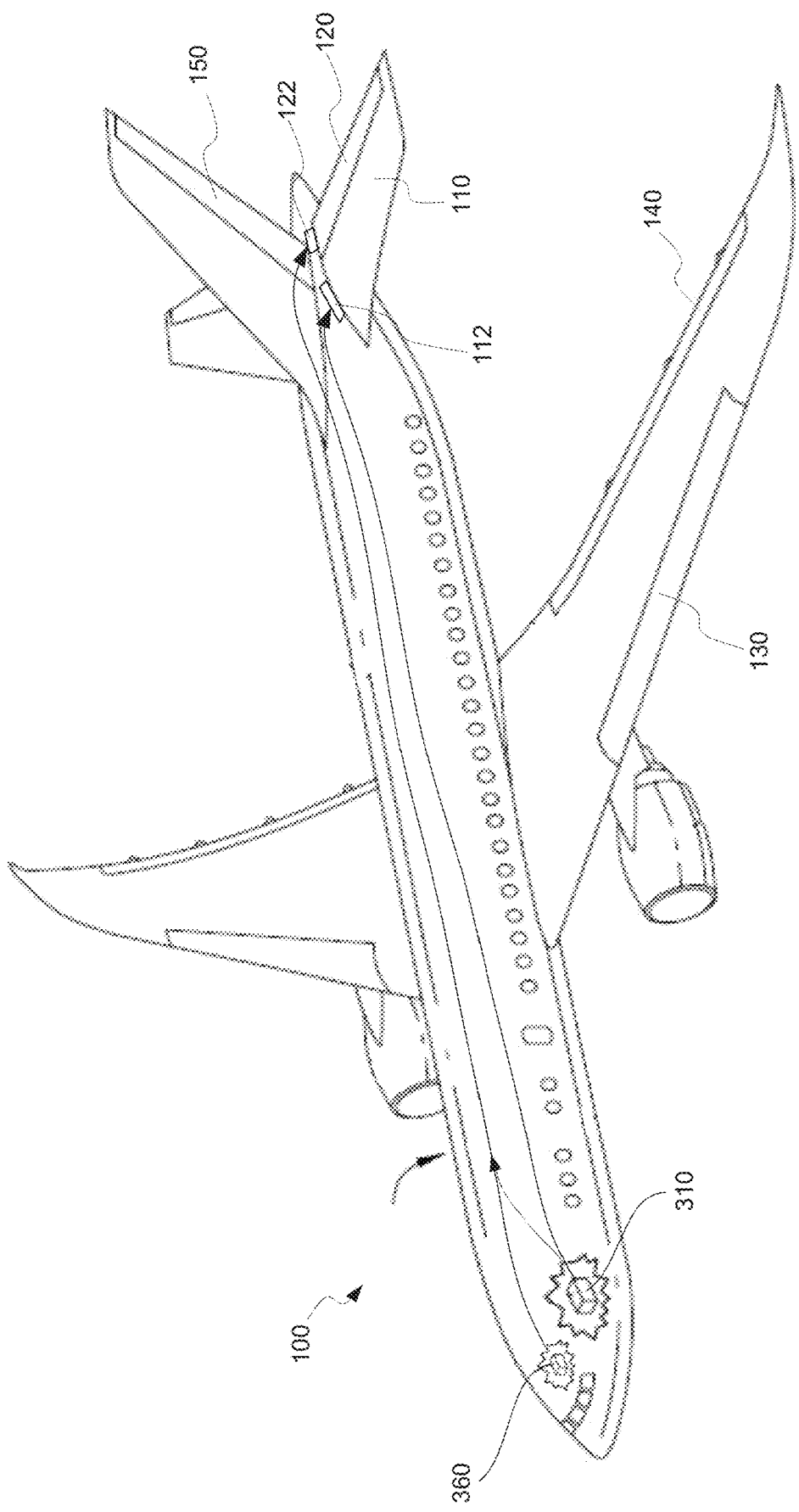
FIG. 1 is a schematic representation of an airplane comprising a stabilizer and an elevator, in accordance with some embodiments.

A brief description of airplane 100, illustrated in FIG. 1, can illustrate some features of this disclosure. Specifically, airplane 100 comprises stabilizer 110 and elevator 120, which are two components of flight control surfaces. Other components of the flight control surface may include slats 130, ailerons 140, and rudder 150. Ailerons 140, elevator 120, and rudder 150 may be viewed as main flight control components. Changing orientation of these components redirects air streams around these components and generates unbalanced forces that rotate airplane 100 about one or more associated axes (e.g., lateral, longitudinal, and/or vertical axis).

Ailerons 140 may be mounted on the trailing edges of wings (e.g., ailerons mounted near the wingtips, while flaps mounted closer to the fuselage). Ailerons 140 move in opposite directions and cause roll and turn of airplane 100. Specifically, a raised aileron reduces lift on that wing, while a lowered aileron increases lift.

Rudder 150 may be mounted on the trailing edge of a vertical stabilizer and used for changing the yaw of airplane 100. Deflecting the rudder right pushes the tail left and, in turn, causes the nose to yaw to the right. Returning the rudder to the neutral position stops the yaw of airplane 100.

Stabilizer 110 is a smaller lifting surface (in comparison to wings) located on the tail of airplane 100 and used for stability and control. Specifically, stabilizer 110 helps with adjustments corresponding to changes in the center of pressure or center of gravity of airplane 100, e.g., caused by changes in speed and attitude, fuel consumption, dropping cargo or payload, and the like. The orientation of stabilizer 110 may be adjusted as further described below. Stabilizer 110 may be also used on other types of aircraft, e.g., non-fixed-wing aircraft, such as helicopters and gyroplanes.

The orientation of stabilizer 110 is controlled by a pilot and/or trim controller 310 via stabilizer orientation mechanism 112.

Elevators 120 may be movably connected (e.g., hinged) to the back of stabilizer 110 and are much smaller than stabilizer 110. Because of this size difference, the orientation of elevators 120 may be changed much faster than the orientation of stabilizer 110. Because of this higher orientation-adjustment speed, elevators 120 can provide more dynamic control, in comparison to stabilizer 110. Two elevators 120, which are positioned on different sides of the tail, move up and down together. Elevators 120 are controlled by a pilot, flight controller 360, and/or trim controller 310 via elevator orientation mechanism 122. Elevators 120 of other airplanes are not controlled by trim controller 310 since elevators 120 are not parts of trim systems. During operation of airplane, raised elevators 120 push down on the tail and cause the nose of airplane 100 to pitch up. This, in turn, makes the wings fly at a higher angle of attack generating more lift and more drag.

Figure 2A:
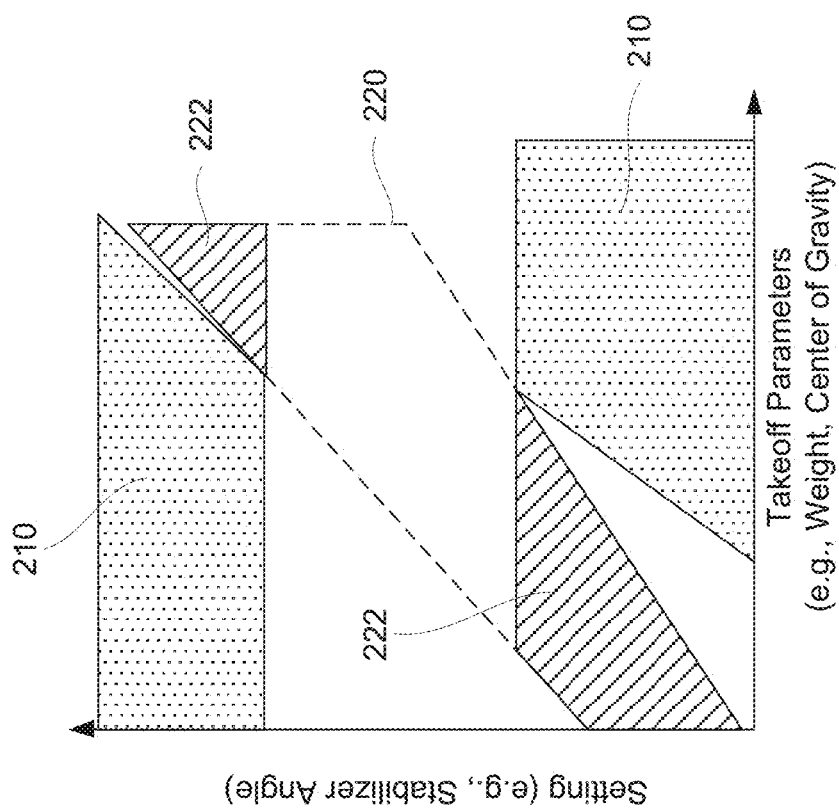
FIGS. 2A and 2B are illustrative plots of operational and nonoperational conditions, corresponding to subranges used for takeoff trim, when the stabilizer orientation is used as the only trim setting, in accordance with some embodiments.
Figure 2B:
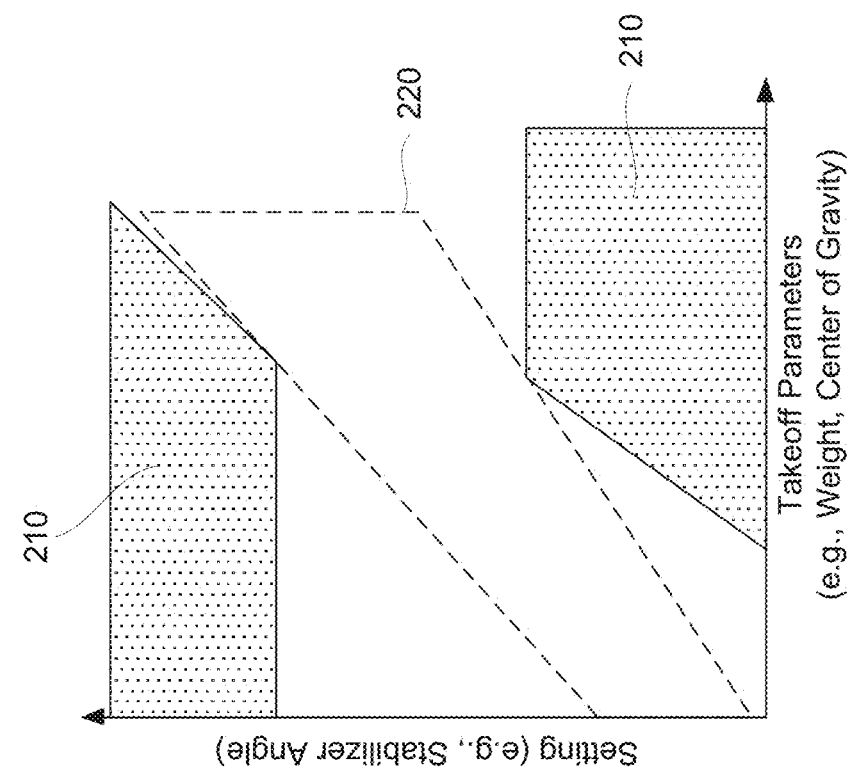

Relying primarily on the stabilizer orientation for takeoff trim presents various problems. FIGS. 2A and 2B are illustrative plots of operational conditions 220 and nonoperational conditions 210 when the stabilizer orientation is used as the primary trim setting. In this example, nonoperational conditions 210 and operational conditions 220 are identified based on various combinations of stabilizer angles and takeoff parameters. Different types of takeoff parameters are within the scope, such as an airplane weight, an airplane center of gravity, a takeoff flap setting, and a takeoff thrust setting. Furthermore, one having ordinary skills in the art would understand that these takeoff parameters have various combined effects. For simplicity, the reference will be made primarily to the airplane weight. For purposes of this disclosure, operational conditions 220 are defined as any combination of stabilizer orientation settings (or, more generally, takeoff trim settings) and takeoff parameters during which the airplane can safely operate, such as complete takeoff. The stabilizer orientation or, more specifically, the stabilizer angle may be defined as a deviation of the stabilizer from its neutral position. Nonoperational conditions 210 are defined as any combination of stabilizer orientation settings (or, more generally, takeoff trim settings) and takeoff parameters that should be avoided. As such, nonoperational conditions 210 are avoided. Furthermore, some operational conditions 220 may be closer to nonoperational conditions 210 and have a higher risk of inadvertently (or erroneously) entering nonoperation conditions. These portions are identified in FIG. 2B with a line pattern and may be referred as susceptible conditions 222. Susceptible conditions 222 are also avoided, if possible, to reduce the overall risk.

For example, a larger stabilizer angle is used for a larger airplane weight to generate tail pitching moment to allow the airplane to be rotated during the takeoff. Furthermore, for a given airplane weight, some range of stabilizer angles is generally acceptable. As such, operational conditions 220 are represented by a sloped block in FIGS. 2A and 2B. If a large stabilizer angle is selected for a small airplane weight, then an excessive trail pitching moment may be generated during the takeoff, which corresponds to nonoperational conditions 210, represented by the top shaded block in FIGS. 2A and 2B. This could cause the airplane to uncontrollably pitch up during the takeoff. In a similar manner, if a small stabilizer angle is selected for a larger airplane weight, then a generated pitching moment may be not high enough for the takeoff, limiting the airplane rotation during takeoff and thus not allowing for the takeoff, which corresponds to nonoperational conditions 210, represented by the bottom shaded block in FIGS. 2A and 2B.

Trim System Examples

Figure 3:
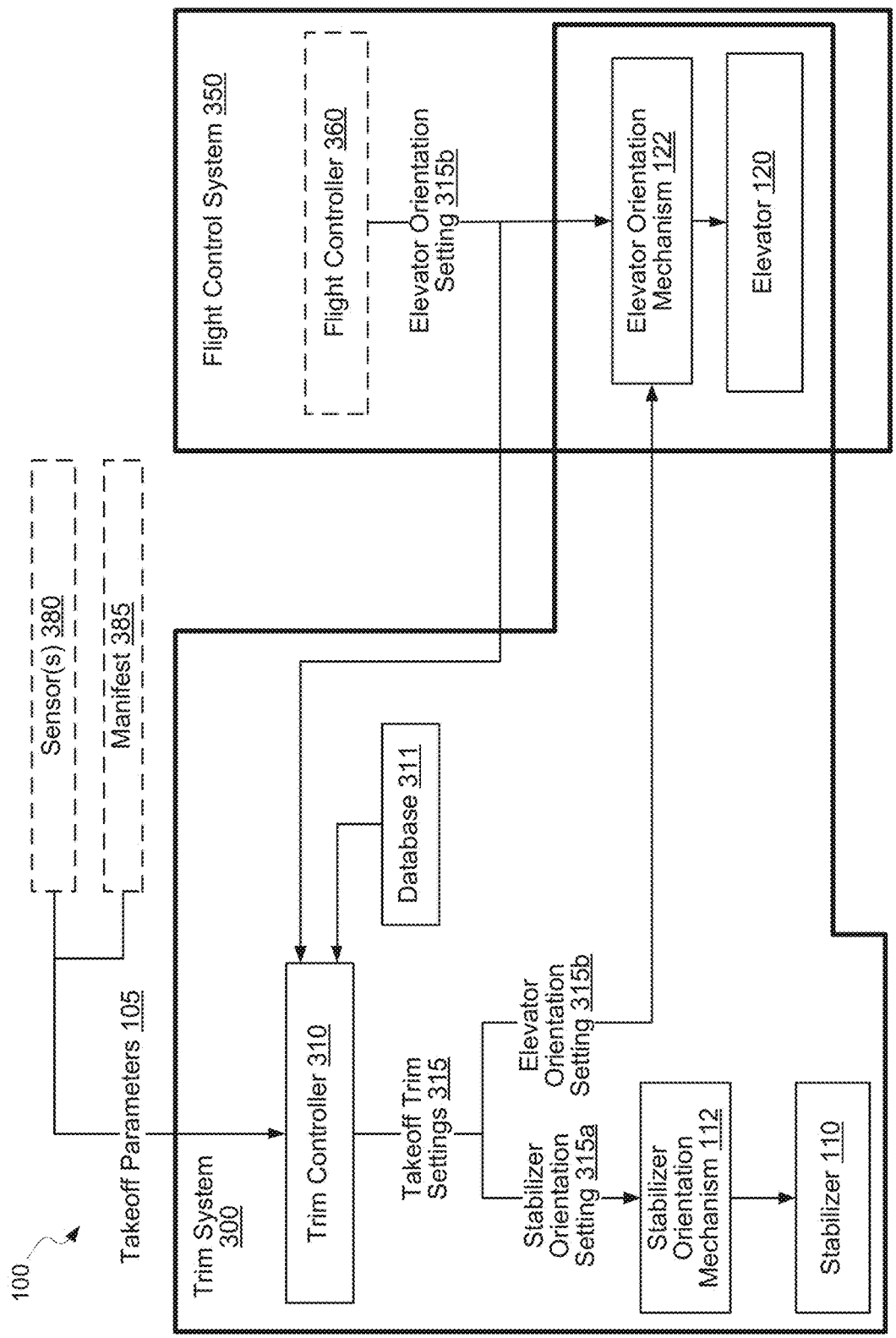
FIG. 3 is a schematic representation of a trim system and a flight control system of the airplane of FIG. 1, in accordance with some embodiments.

FIG. 3 is a schematic representation of trim system 300 and flight control system 350 of airplane 100, in accordance with some embodiments. Trim system 300 may comprise a trim controller 310, stabilizer orientation mechanism 112, and stabilizer 110. Furthermore, unlike other trim systems, trim system 300 presented in FIG. 3 also comprises elevator orientation mechanism 122 and elevator 120. In other words, stabilizer 110 and elevator 120 are both parts of trim system 300. It should be noted that elevator orientation mechanism 122 and elevator 120 are also parts of flight control system 350. As such, the operation and functionality of elevator 120 is shared by flight control system 350 and trim system 300 as further described below.

Figure 4A:
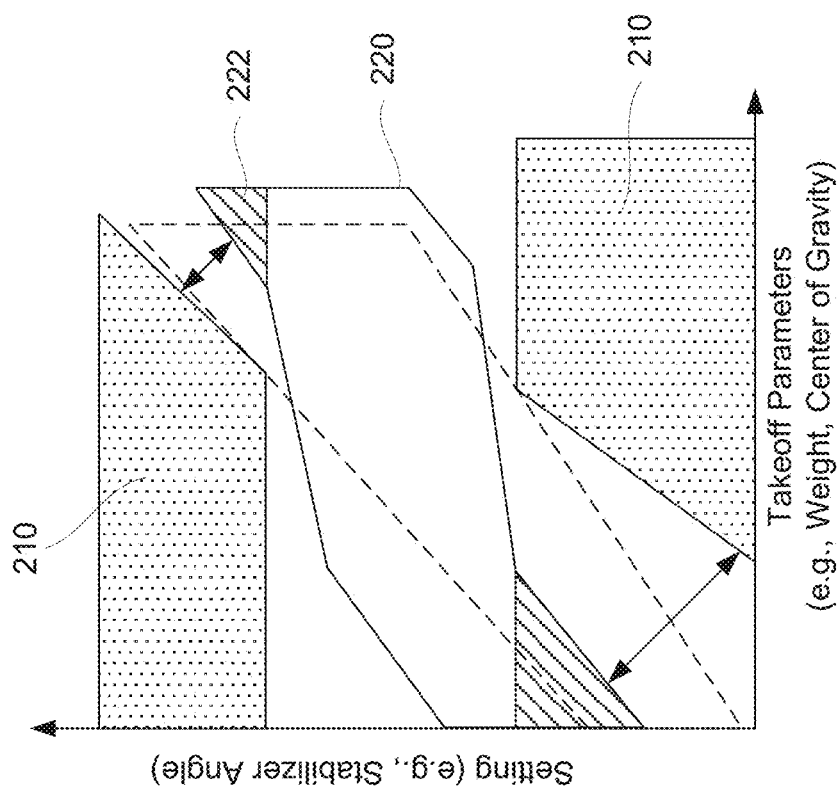
FIGS. 4A and 4B are illustrative plots of operational and nonoperational conditions, corresponding to subranges used for takeoff trim, when stabilizer and elevator orientations are used as trim settings, in accordance with some embodiments.

FIG. 4A is an example of operational conditions 220 and nonoperational conditions 210 when stabilizer and elevator orientations are used as trim settings, in accordance with some embodiments. Comparing the plots of FIG. 2B and FIG. 4A, it can be seen that in using stabilizer and elevator orientations together as trim settings the susceptible conditions 222 can be avoided entirely.

Figure 4B:
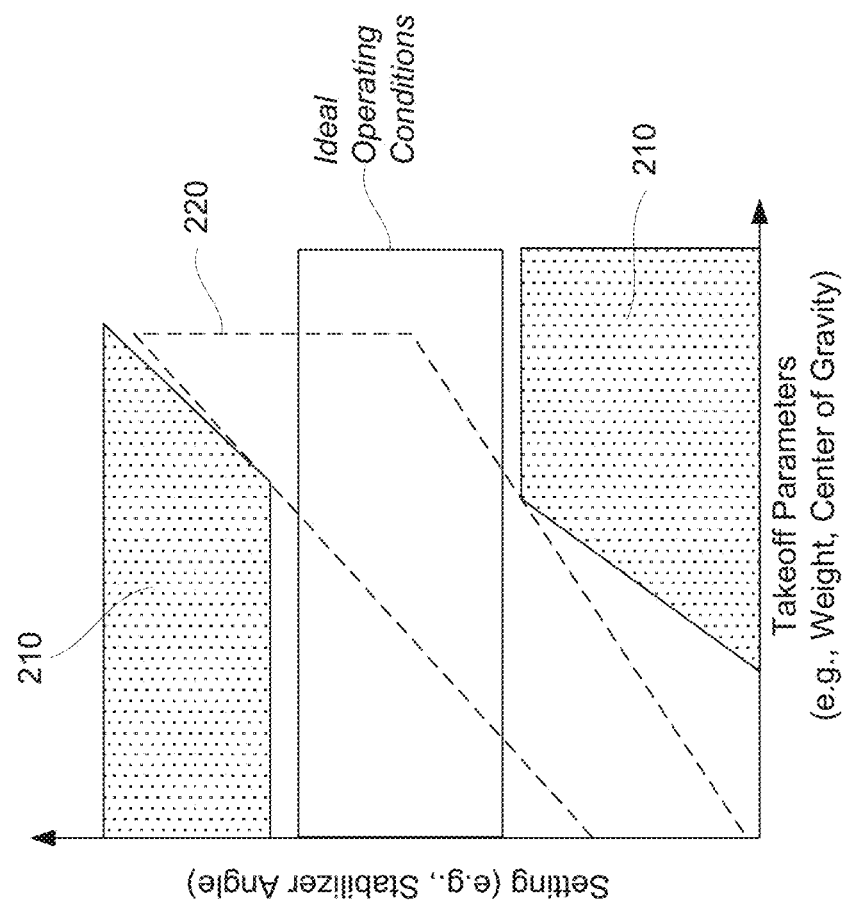

FIG. 4B is an example of operational conditions 220 and nonoperational conditions 210 when stabilizer and elevator orientations are used together as trim settings, in accordance with some embodiments. Comparing the plots of FIG. 2B and FIG. 4B, it is clear that that operational conditions 220 shown in FIG. 4B are further separated from nonoperational conditions 210 than that in FIG. 2B. As such, using stabilizer and elevator orientations as trim settings has improved performance.

Trim controller 310 is operable to determine takeoff trim settings 315 and further adjust these trim settings after the takeoff. Trim controller 310 may be a computer system, some examples of which are described below. In some embodiments, operations associated with determining takeoff trim settings 315 are performed automatically, e.g., using database 311 which may be connected to trim controller 310 or be a part of trim controller 310. One example of database 311 is a look-up database. Furthermore, airplane takeoff parameters 105 used to determine takeoff trim settings 315 may be transmitted directly to trim controller 310. Alternatively, some aspects associated with operations, during which takeoff trim settings 315 are determined and/or airplane takeoff parameters 105 are transmitted, may be performed by a pilot. For example, the pilot may manually enter at least some of airplane takeoff parameters 105 (provided in manifest 385) into trim controller 310. Furthermore, the pilot may manually determine takeoff trim settings 315 (based on airplane takeoff parameters 105) using, for example, a visual representation of database 311, e.g., on a user interface of trim controller 310 or a paper version.

In some embodiments, trim controller 310 is communicatively coupled to sensor 380 (or multiple sensors) of airplane 100 operable to generate and transmit at least some of airplane takeoff parameters 105 to trim controller 310. One example of sensor 380 is a landing gear weight sensor. When a weight sensor is installed into landing gear or, more specifically, into each landing gear of airplane 100, a combined output of these sensors may be used to determine the total weight of airplane 100 and position of the center of gravity.

Takeoff trim settings 315 comprise stabilizer orientation setting 315a and elevator orientation setting 315b. One example of stabilizer orientation setting 315a is an angle of stabilizer 110 relative to the neutral position of stabilizer 110.

Trim controller 310 is communicatively coupled to at least one of stabilizer orientation mechanism 112 or elevator orientation mechanism 122. Stabilizer orientation setting 315a is then transmitted to stabilizer orientation mechanism 112 to control the orientation (e.g., the angle) of stabilizer 110. Stabilizer 110 is mechanically coupled to stabilizer orientation mechanism 112. Stabilizer orientation mechanism 112 may be a hydraulic, electric, or other types of mechanism operable to change the orientation.

Elevator orientation setting 315b is transmitted to elevator orientation mechanism 122 to control the orientation (e.g., the angle) of elevator 120. Elevator 120 is mechanically coupled to elevator orientation mechanism 122. Elevator orientation mechanism 122 may be a hydraulic, electric, or other types of mechanism operable to change the orientation. Because of the use of elevator 120 as a primary device for maneuvering airplane 100, elevator 120 is designed to move fast.

Stabilizer 110 is primarily used as a trim device, meaning that stabilizer 110 does not move fast, in particular due to the large size of stabilizer 110. Faster moving rates present many challenges in the design of the stabilizer orientation mechanism. Due to of the smaller size of elevator 120 in comparison to stabilizer 110, elevator orientation mechanism 122 can change the orientation of elevator 120 faster than stabilizer orientation mechanism 112 can change the orientation of stabilizer 110. Furthermore, it should be noted that elevator orientation mechanism 122 is also controlled by flight controller 360. In other words, elevator orientation setting 315b are received by elevator orientation mechanism 122 from trim controller 310 and from flight controller 360. The total operating range of elevator 120 is divided into elevator takeoff sub-range and flight control margins as further explained.

Takeoff trim settings 315 are determined by trim controller 310 (or the pilot) based on airplane takeoff parameters 105. Some examples of airplane takeoff parameters 105 include an airplane weight, an airplane center of gravity, an airplane flap setting, and an airplane takeoff thrust setting. The effect of the airplane weight on at least stabilizer orientation setting 315a is described above. One having ordinary skills in the art would understand the effect of other airplane takeoff parameters 105 on takeoff trim settings 315.

Flight control system 350 comprises flight controller 360 operable to generate elevator orientation setting 315b and transmit these setting to elevator orientation mechanism 122 for changing the orientation of elevator 120. One having ordinary skills in the art would understand that flight controller 360 is also operable to generate various other flight control instructions used by other components of airplane 100, some of which are described above.

Method Examples

Figure 5:
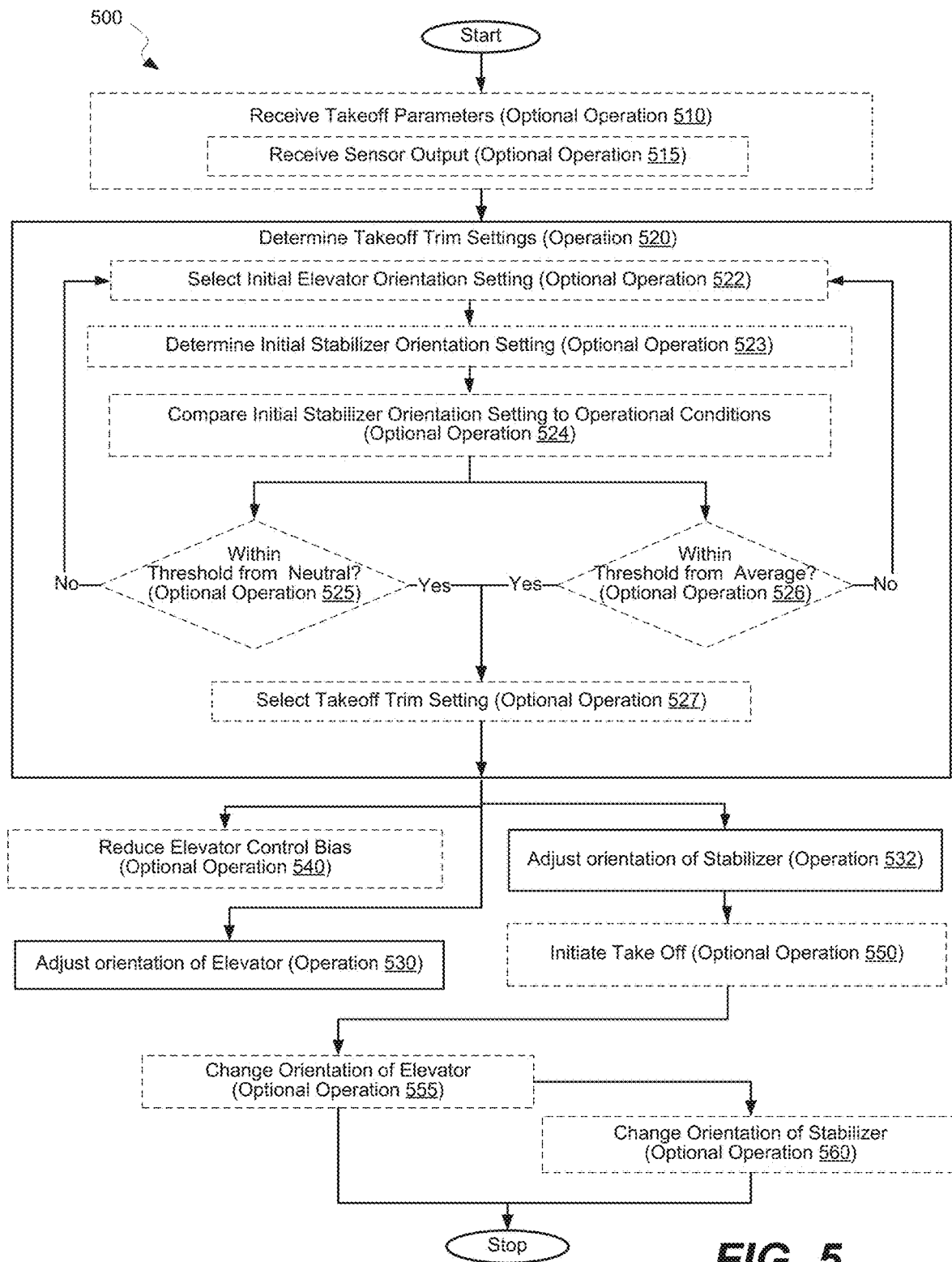
FIG. 5 is a process flowchart of a method of controlling a trim system of an airplane, in accordance with some embodiments.

FIG. 5 is a process flowchart corresponding to method 500 of controlling trim system 300 of airplane 100, in accordance with some embodiments. Some operations of method 500 are performed prior to the takeoff of airplane 100, while other operations may be performed during and after the takeoff.

Method 500 may commence with receiving airplane takeoff parameters 105 during optional operation 510. Some examples of airplane takeoff parameters 105 include the airplane weight, airplane center of gravity, takeoff flap setting, and takeoff thrust setting. Airplane takeoff parameters 105 may be received in various forms, e.g., manually entered by a pilot from manifest 385 and/or automatically received from one or more external systems (e.g., airport systems) or sensors 380 of airplane 100. In the latter case, optional operation 510 also comprises receiving sensor output during optional operation 515.

Method 500 comprises determining takeoff trim settings 315 during operation 520. Takeoff trim settings 315 are determined based on airplane takeoff parameters 105. Operation 520 may be performed by trim controller 310 and may be fully automated. Alternatively, at least some aspects of optional operation 510 may be performed manually, e.g., by a pilot using a lookup database (e.g., an electronic database or a paper-based table).

As noted above, takeoff trim settings 315 comprise stabilizer orientation setting 315a and elevator orientation setting 315b. Elevator orientation setting 315b may be within elevator takeoff sub-range 602 of elevator total operating range 600. Additional elevator orientation settings (e.g., outside of elevator takeoff sub-range 602) may be provided by flight controller 360. This division of elevator total operating range 600 between flight controller 360 and trim controller 310 allows to achieve dual-functionality of elevator 120 as will now be explained with reference to FIG. 6.

Figure 6:
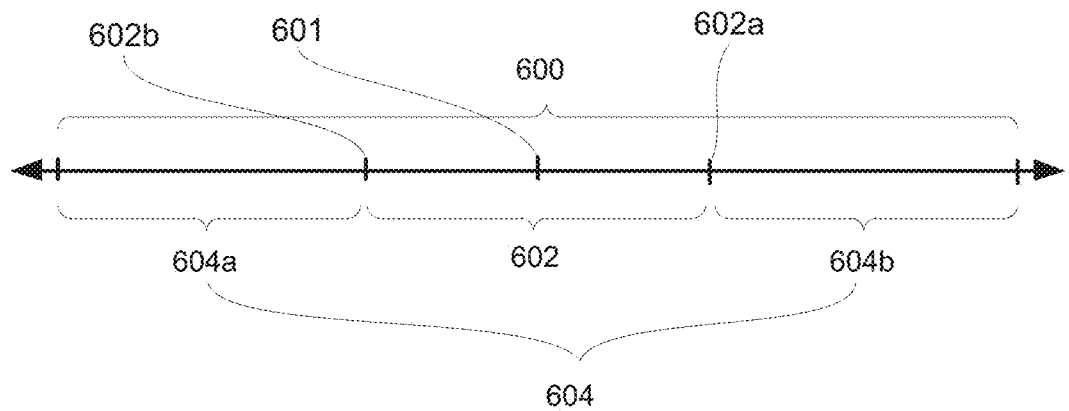
FIG. 6 is a schematic representation of an example of an elevator operating range, in accordance with some embodiments.

FIG. 6 is a schematic illustration of elevator total operating range 600, which includes elevator takeoff sub-range 602 as well as flight control margins 604a and 604b. Flight control margins 604a and 604b may be collectively referred to as flight control margins 604. The ranges of flight control margins 604a and 604b may be the same. Elevator takeoff sub-range 602 is defined and separated from flight control margins 604a and 604b by takeoff limits 602a and 602b. FIG. 6 also illustrates neutral orientation 601 of elevator 120. In some embodiments, neutral orientation 601 may be positioned in the middle of elevator total operating range 600 such that elevator 120 may travel (e.g., turn) equal amounts on each side of neutral orientation 601. Furthermore, neutral orientation 601 may be positioned in the middle of elevator takeoff sub-range 602.

The ratio of elevator takeoff sub-range 602 to elevator total operating range 600 may depend on the set stabilizer sub-range, the elevator deflection from its takeoff trim position used to perform the takeoff rotation, and the elevator deflection from its takeoff trim position used to meet other airplane design aspects and may be between about one-third to one-half of the total operation range. In general, elevator takeoff sub-range 602 may be set based on the flight control aspects of elevator 120. In other words, certain minimal range is allocated for one or both of flight control margins 604a and 604b based on the flight control aspects.

Returning to FIG. 5, while determining takeoff trim settings 315 during operation 520, stabilizer orientation setting 315a and elevator orientation setting 315b may be viewed as two dependent variables (both depend on airplane takeoff parameters 105). Stabilizer orientation setting 315a and elevator orientation setting 315b are interdependent. As such for each set of airplane takeoff parameters 105, different combinations of stabilizer orientation setting 315a and elevator orientation setting 315b may be available. In some implementations, for a given stabilizer orientation, there will be a single elevator orientation setting employed.

At the time and after the actual takeoff of airplane 100, the orientation of elevator 120 can be changed faster than the orientation of stabilizer 110. At the same, the orientation of elevator 120 is also used for flight control (referring the division of elevator total operating range 600 described above with reference to FIG. 6). In light of these considerations, in some embodiments, for a given set of airplane takeoff parameters 105, elevator orientation setting 315b may be treated as an independent variable, while stabilizer orientation setting 315a may be treated as a dependent variable. In these embodiments, operation 520 may involve selecting some initial elevator orientation setting (during optional operation 522), determining an initial stabilizer orientation setting based on the initial elevator orientation setting (during optional operation 523), and comparing the initial stabilizer orientation setting to the operational conditions (during optional operation 524). Depending on conditions set for the initial elevator and stabilizer orientation settings (checked during operation 525 and/or operation 526), optional operation 522, optional operation 523, and optional operation 524 may be repeated until the initial settings with a set range are found, at which point these initial settings are selected as elevator orientation setting 315b and initial stabilizer orientation setting as the stabilizer orientation setting 315a (during optional operation 527).

Different examples of selecting the initial elevator orientation settings and evaluating the initial elevator and stabilizer orientation settings are within the scope. For example, one of takeoff limits 602a may be selected as the initial elevator orientation setting during optional operation 522. Alternatively, neutral orientation 601 of elevator 120 may be selected as the initial elevator orientation setting during optional operation 522. Stabilizer orientation setting 315a may be then determined based on this initial elevator orientation selection during optional operation 523 (as well as based on airplane takeoff parameters 105). Databases (e.g., lookup table) and/or computer algorithms may be used for this operation.

In some embodiments, evaluation of the initial elevator and stabilizer orientation settings is performed during operation 525 and 526. For example, operation 525 involves checking if the initial elevator orientation setting is within a threshold from to neutral orientation 601. The threshold may be less than 10% or even less than 5% of the total operating range of elevator 120. Operation 525 may involve comparing the initial elevator orientation setting to neutral orientation 601 of elevator 120 while the initial stabilizer orientation setting is within operational conditions 220. In some embodiments, if it is possible to bring the initial elevator orientation setting closer to neutral orientation 601 of elevator 120 while the initial stabilizer orientation setting is retained within operational conditions 220, optional operation 522, optional operation 523, and optional operation 524 may be repeated. This algorithm allows achieving the least bias in elevator controls.

In another example, operation 526 involves comparing the initial stabilizer orientation setting to the operational conditions to see if the initial stabilizer orientation setting is within a set threshold from the average of operational conditions 220. The goal is to have stabilizer orientation setting 315a that is farthest away from nonoperational conditions 210. For example, the threshold may be less than 10% or even less than 5% of the total operating range of stabilizer 110.

Figure 7A:
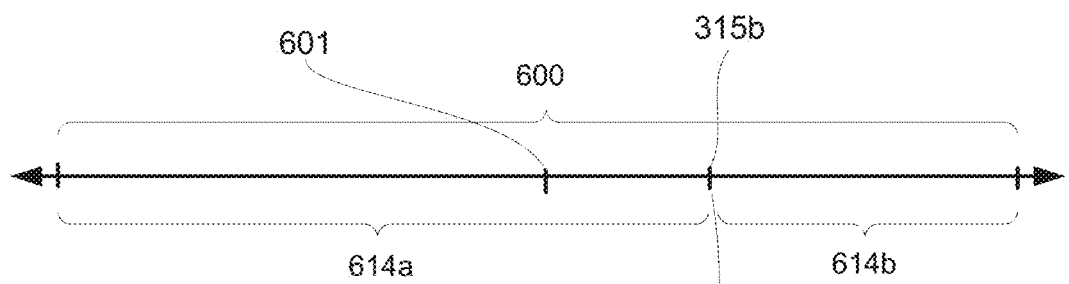
FIG. 7A-7B are schematic representations of correspondence between elevator operating settings and elevator control settings, in accordance with some embodiments.
Figure 7B:
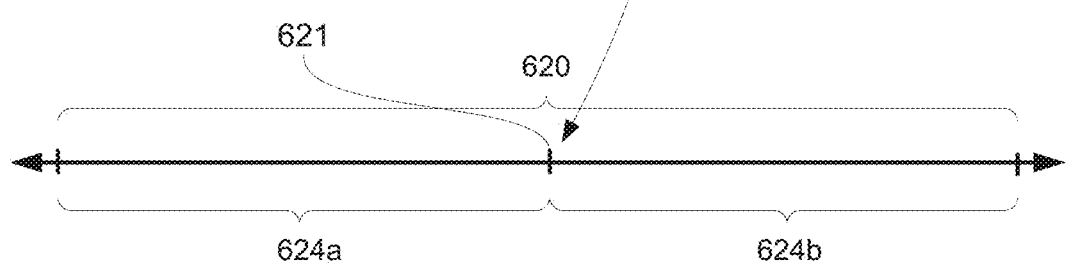

When elevator orientation setting 315b (a part of takeoff trim settings 315) provided by trim system 300 does not correspond to neutral orientation 601 of elevator 120, an elevator control bias may exist. In some embodiments, the elevator control bias is reduced or even eliminated during optional operation 540. Various aspects of this operation will now be described with reference to FIGS. 7A and 7B. Specifically, FIG. 7A illustrates one example of elevator orientation setting 315b provided by trim system 300 and presented in FIG. 7A on elevator total operating range 600. In this example, elevator orientation setting 315b (determined during operation 520) does not correspond to neutral orientation 601. Elevator orientation setting 315b divides elevator total operating range 600 into two uneven operating sub-ranges, i.e., first operating sub-range 614a and second operating sub-range 614b. While elevator 120 is fully functional for the flight control in these respective operating sub-ranges, having these uneven operating sub-ranges and elevator 120 being at elevator orientation setting 315b may be confusing at least to a pilot. To eliminate this elevator control bias, elevator orientation setting 315b is assigned neutral control point 621, which may be positioned in the middle of elevator total control range 620 (referring to correspondence between FIGS. 7A and 7B). As such, neutral control point 621 divides elevator total control range 620 into even control sub-ranges, i.e., first control sub-range 624a and second control sub-range 624b. In this example, first control sub-range 624a corresponds to first operating sub-range 614a, while second control sub-range 624b corresponds to second operating sub-range 614b. In some embodiments, each of first control sub-range 624a and second control sub-range 624b is proportionally adjusted to cover elevator total operating range 600. Alternatively, only a portion of elevator total operating range 600 based on the smallest one of first operating sub-range 614a and second operating sub-range 614b.

Method 500 proceed with adjusting the actual orientation of stabilizer 110 (e.g., the angle of stabilizer 110) during operation 532. This orientation may be adjusted using stabilizer orientation mechanism 112 and in accordance with stabilizer orientation setting 315a, determined during operation 520. Operation 532 is performed prior to the takeoff of airplane 100. Furthermore, the orientation of stabilizer 110 may be further adjusted after the takeoff (performed during optional operation 550 shown in FIG. 5). This type of stabilizer adjustment is further described below with reference to operation 560.

Method 500 also involves adjusting orientation of elevator 120 (e.g., the angle of elevator 120) during operation 530. For example, the orientation may be adjusted using elevator orientation mechanism 122 and in accordance with elevator orientation setting 315b, determined during operation 520. Operation 530 is also performed prior to the takeoff of airplane 100. Additional adjustment of the elevator orientation during and after takeoff is performed as a part of the flight control.

In some embodiments, method 500 further comprises initiating the takeoff of airplane 100 during optional operation 550. Optional operation 550 is performed with the orientation of stabilizer 110 in accordance with stabilizer orientation setting 315a, which are part of takeoff trim settings 315. Furthermore, the orientation of elevator 120, at least initially, is in accordance with elevator orientation setting 315b (a part of takeoff trim settings 315). During optional operation 550 or thereafter, the orientation of elevator 120 may be changed as a part of the flight control as reflected by block 555 in FIG. 5.

Figure 8:
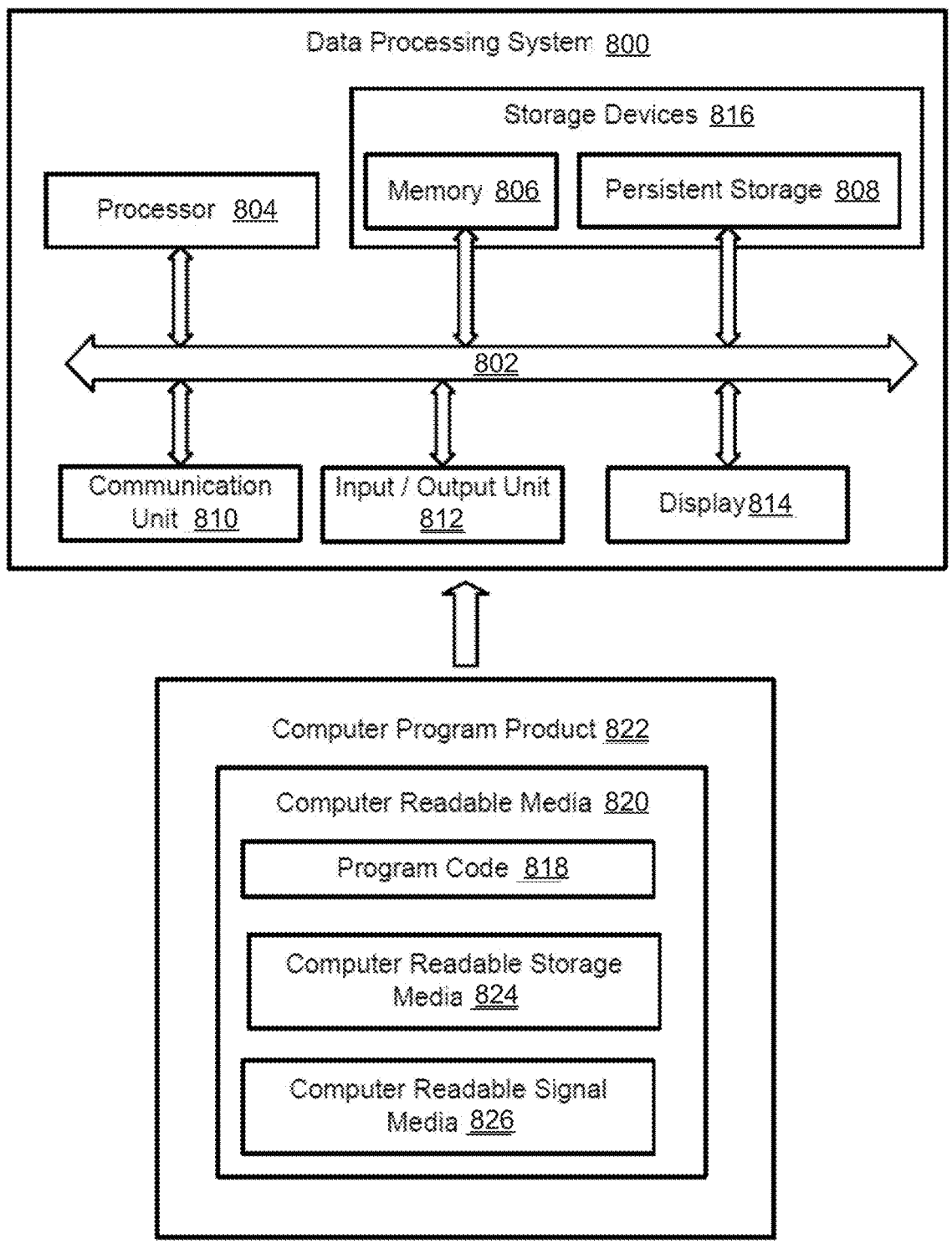
FIG. 8 illustrates a data processing system configured in accordance with some embodiments.

In some embodiments, method 500 may further comprise changing the orientation of stabilizer 110 after completing the takeoff (during optional operation 550) during operation 560. For example, the orientation of stabilizer 110 may be changed, for example, to bring neutral control point 621 to correspond to neutral orientation 601 of elevator 120, thereby eliminating the elevator control bias or at least reducing the elevator control bias. In other words, takeoff trim settings 315 may be changed after the takeoff Controller Examples FIG. 8 illustrates data processing system 800 configured in accordance with some embodiments and which may be used as trim controller 310. Data processing system 800, also referred to herein as a computer system, may be used to implement one or more computers or processing devices used to control various components of devices and systems described above. In some embodiments, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, as may be included in a multi-processor core. In various embodiments, processor unit 804 is specifically configured and optimized to process data, such as airplane takeoff parameters 105. Thus, processor unit 804 may be an application specific processor that may be implemented as one or more application specific integrated circuits (ASICs) within a processing system. Such specific configuration of processor unit 804 may provide increased efficiency when processing the specific types of data involved with the previously described systems, devices, and methods. Moreover, in some embodiments, processor unit 804 may be include one or more reprogrammable logic devices, such as field-programmable gate arrays (FPGAs), that may be programmed or specifically configured to optimally perform the previously described processing operations in the context of large and complex data sets.

Memory 806 and persistent storage 808 are examples of storage devices 816. A storage device is any piece of hardware that is capable of storing information, such as, for example, data, program code in functional form, and/or other suitable information either on a temporary basis and/or a permanent basis, and more specific examples, database 311. Storage devices 816 may also be referred to as computer readable storage devices in these illustrative examples. Memory 806, in these examples, may be, for example, random access memory or any other suitable volatile or non-volatile storage device. Persistent storage 808 may take various forms, depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices such as sensors 380 and external systems (e.g., airport systems). In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user, e.g., airplane takeoff parameters 105 to pilot.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and the computer readable media 820 form computer program product 822 in these illustrative examples. In one example, computer readable media 820 may be computer readable storage media 824 or computer readable signal media 826. In these illustrative examples, computer readable storage media 824 is a physical or tangible storage device used to store program code 818.

Alternatively, program code 818 may be transferred to data processing system 800 using computer readable signal media 826. Computer readable signal media 826 may be, for example, a propagated data signal, which may contain program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system operable to run program code 818.

Airplane Examples

While the systems, apparatus, and methods disclosed above have been described with reference to airplanes and the aerospace industry, it will be appreciated that the embodiments disclosed herein may be applied to any other context as well, such as automotive, railroad, and other mechanical and vehicular contexts.

Figure 9:
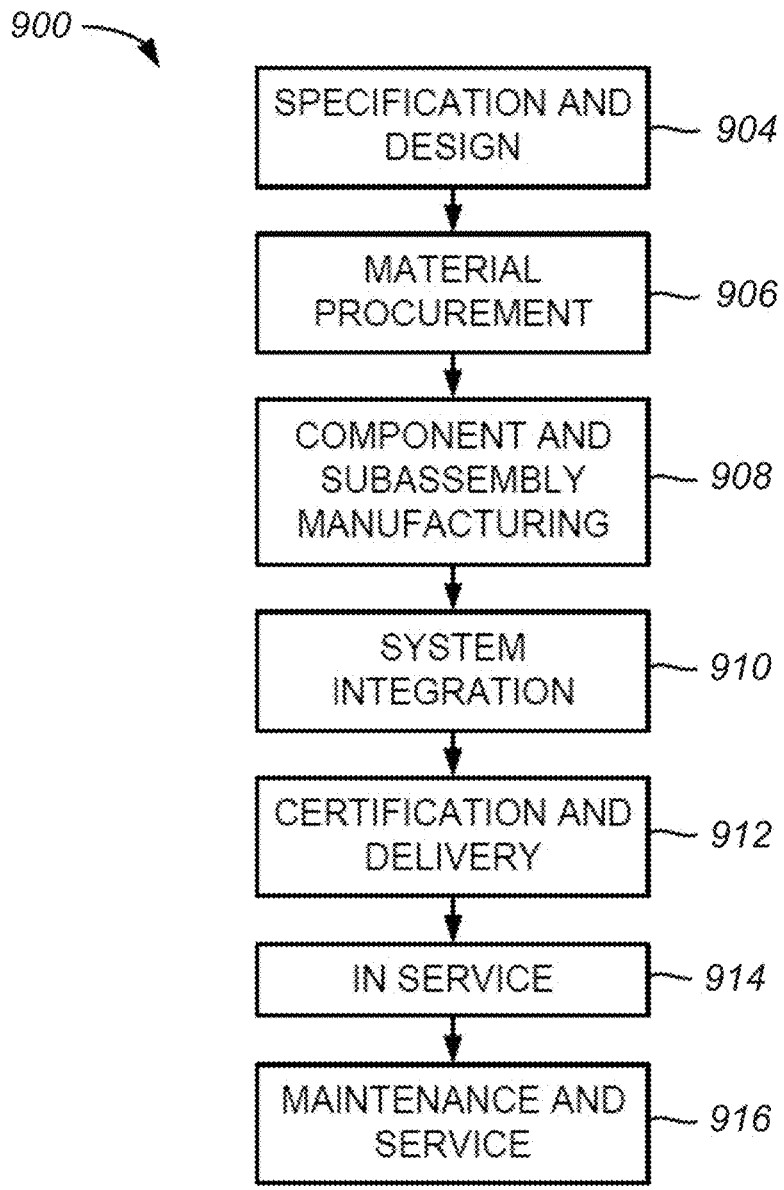
FIG. 9 illustrates a flow chart of an example of an airplane production and service methodology, in accordance with some embodiments.
Figure 10:
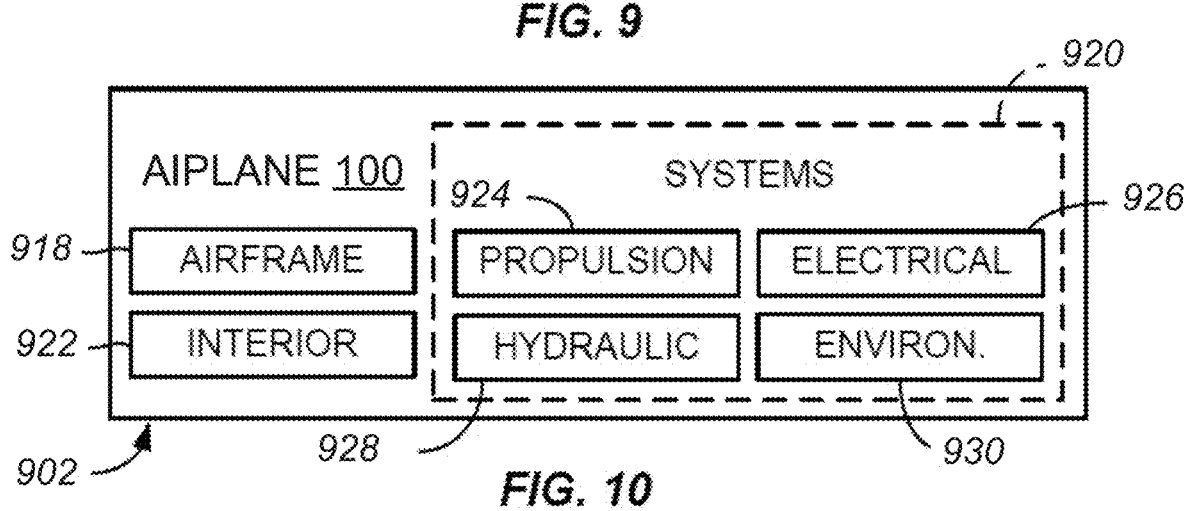
FIG. 10 illustrates a block diagram of an example of an airplane, in accordance with some embodiments.

Accordingly, embodiments of the disclosure may be described in the context of an airplane manufacturing and service method 900 as shown in FIG. 9 and airplane 100 as shown in FIG. 10. During pre-production, method 900 may include the specification and design 904 of airplane 100 and material procurement 906. During production, component and subassembly manufacturing 908 and system integration 910 of airplane 100 takes place. Thereafter, airplane 100 may go through certification and delivery 912 in order to be placed in service 914. While in service by a customer, the airplane 100 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include any number of airplane manufacturers and major-system subcontractors; a third party may include any number of venders, subcontractors, and suppliers; and an operator may be an airline, leasing company, military entity, service organization, and so on.

As shown in FIG. 10, the airplane 100 produced by method 900 may include airframe 918 with plurality of systems 920, and interior 922. Examples of systems 920 include one or more of propulsion system 924, electrical system 926, hydraulic system 928, and environmental system 930. Any number of other systems may be included. Although an aerospace example is shown, the principles of the embodiments disclosed herein may be applied to other industries, such as the automotive industry.

Although the foregoing concepts have been described in some detail for purposes of clarity of understanding, it will be apparent that certain changes and modifications may be practiced within the scope of the appended claims. There are many alternative ways of implementing the processes, systems, and apparatus. Accordingly, the present examples are to be considered as illustrative and not restrictive.

CONCLUSION

Illustrative, non-exclusive examples of inventive features according to the present disclosure are described in the following enumerated paragraphs:

A1. Method 500 of controlling trim system 300 of airplane 100, method 500 comprising:
  determining takeoff trim settings 315 based on airplane takeoff parameters 105,
    wherein takeoff trim settings 315 comprise stabilizer orientation setting 315a and elevator orientation setting 315b, and
    wherein airplane takeoff parameters 105 comprise at least one parameter selected from one of an airplane weight, an airplane center of gravity, a takeoff flap setting, or a takeoff thrust setting;
  adjusting orientation of stabilizer 110 of airplane 100 using stabilizer orientation mechanism 112 of airplane 100 in accordance with stabilizer orientation setting 315a of takeoff trim settings 315; and
  adjusting orientation of elevator 120 of airplane 100 using elevator orientation mechanism 122 of airplane 100 in accordance with elevator orientation setting 315b of takeoff trim settings 315.

A2. Method 500 of paragraph A1, wherein elevator orientation setting 315b of takeoff trim settings 315 is different from to neutral orientation 601 of elevator 120.

A3. Method 500 of paragraph A1 or A2, wherein stabilizer orientation setting 315a and elevator orientation setting 315b of takeoff trim settings 315 are interdependent.

A4. Method 500 of paragraph A3, wherein determining takeoff trim settings 315 comprises determining stabilizer orientation setting 315a based on elevator orientation setting 315b.

A5. Method 500 of paragraph A4, wherein determining stabilizer orientation setting 315a based on elevator orientation setting 315b comprises:
  selecting an initial elevator orientation setting;
  determining an initial stabilizer orientation setting based on initial elevator orientation setting;
  comparing initial stabilizer orientation setting to operational conditions 220;
  selecting initial elevator orientation setting as elevator orientation setting 315b and initial stabilizer orientation setting as stabilizer orientation setting 315a.

A6. Method 500 of paragraph A5, wherein initial elevator orientation setting is takeoff limit 602a of elevator takeoff sub-range 602, elevator takeoff sub-range 602 being portion of elevator total operating range 600, elevator total operating range 600 further comprising one or more flight control margins 604, elevator takeoff sub-range 602 is set based on flight control aspects of elevator 120.

A7. Method 500 of paragraph A5, wherein initial elevator orientation setting is neutral orientation 601 of elevator 120.

A8. Method 500 of paragraph A5, A6, or A7, wherein selecting initial elevator orientation setting, determining initial stabilizer orientation setting, and comparing initial stabilizer orientation setting to operational conditions 220 are repeated until initial stabilizer orientation setting is within a set threshold from an average of operational conditions 220.

A9. Method 500 of paragraph A5, A6, or A7, wherein selecting initial elevator orientation setting, determining initial stabilizer orientation setting, and comparing initial stabilizer orientation setting to operational conditions 220 are repeated until initial elevator orientation setting is within a set threshold from neutral orientation 601 while initial stabilizer orientation setting is within operational conditions 220.

A10. Method 500 of any one of paragraphs A1-A9, further comprising, if elevator orientation setting 315b is different from neutral orientation 601, reducing elevator control bias in flight control system 350.

A11. Method 500 of any of paragraphs A1-A10, wherein flight control system 350 is a fly-by-wire system.

A12. Method 500 of any of paragraphs A1-A11, wherein determining takeoff trim settings 315 is performed using database 311.

A13. Method 500 of any of paragraphs A1-A11, further comprising initiating takeoff of airplane 100 with orientation of stabilizer 110 in accordance with stabilizer orientation setting 315a and with orientation of elevator 120 in accordance with elevator orientation setting 315b.

A14. Method 500 of paragraph A13, further comprising changing orientation of stabilizer 110 after takeoff until neutral control point 621 of flight control system 350 corresponds to neutral orientation 601 of elevator 120.

A15. Method 500 of any of paragraphs A1-A14, further comprising receiving airplane takeoff parameters 105.

A16. Method 500 of paragraph A15, wherein at least one of airplane takeoff parameters 105 is received from sensor 380 of airplane 100.

A17. Method 500 of paragraph A16, wherein sensor of airplane 100 comprises a weight sensor installed in landing gear of airplane 100.

B1. Trim system 300 of airplane 100, trim system 300 comprising:
  a trim controller 310, operable to determine takeoff trim settings 315 of airplane 100 based on airplane takeoff parameters 105,
    wherein takeoff trim settings 315 comprise stabilizer orientation setting 315a and elevator orientation setting 315b, and
    wherein airplane takeoff parameters 105 comprise at least one parameter selected from one of an airplane weight, an airplane center of gravity, an airplane flap setting, or an airplane takeoff thrust setting;
  a stabilizer orientation mechanism 112, controllable based on stabilizer orientation setting 315a;
  a stabilizer 110, mechanically coupled to stabilizer orientation mechanism 112, wherein stabilizer orientation mechanism 112 is operable to change orientation of stabilizer 110 based on stabilizer orientation setting 315*a;* an elevator orientation mechanism 122, controllable based on elevator orientation setting 315*b;* and an elevator 120, mechanically coupled to elevator orientation mechanism 122, wherein elevator orientation mechanism 122 is operable to change orientation of elevator 120 based on elevator orientation setting 315*b*.

B2. Trim system 300 of paragraph B1, wherein trim controller 310 is communicatively coupled to at least one of stabilizer orientation mechanism 112 or elevator orientation mechanism 122.

B3. Trim system 300 of any one paragraphs B1 and B2, wherein trim controller 310 is operable to receive elevator orientation setting 315*b* from flight controller 360 and to determine stabilizer orientation setting 315*a* based on elevator orientation setting 315*b* received from flight controller 360.

B4. Trim system 300 of any one paragraphs B1-B3, wherein elevator orientation setting 315*b* of takeoff trim settings 315 is different from to neutral orientation 601 of elevator 120.

B5. Trim system 300 of any one paragraphs B1-B4, wherein stabilizer orientation setting 315*a* and elevator orientation setting 315*b* of takeoff trim settings 315 are interdependent.

B6. Trim system 300 of any one paragraphs B1-B5, wherein trim controller 310 is operable to determine stabilizer orientation setting 315*a* based on elevator orientation setting 315*b*.

B7. Trim system 300 of paragraph B6, wherein trim controller 310 is operable to:

select an initial elevator orientation setting;

determine an initial stabilizer orientation setting based on initial elevator orientation setting;

compare initial stabilizer orientation setting to operational conditions 220;

select initial elevator orientation setting as elevator orientation setting 315*b* and initial stabilizer orientation setting as stabilizer orientation setting 315*a*.

B8. Trim system 300 of paragraph B7, wherein the initial elevator orientation setting is takeoff limit 602*a* of elevator takeoff sub-range 602, elevator takeoff sub-range 602 being portion of elevator total operating range 600, elevator total operating range 600 further comprising one or more flight control margins 604, elevator takeoff sub-range 602 is set based on flight control aspects of elevator 120.

B9. Trim system 300 of paragraph B7, wherein the initial elevator orientation setting is neutral orientation 601 of elevator 120.

B10. Trim system 300 of any one of paragraph B7-B9, wherein trim controller 310 is operable to repeat selecting initial elevator orientation setting, determining initial stabilizer orientation setting, and comparing initial stabilizer orientation setting to operational conditions 220 until the initial stabilizer orientation setting is within a set threshold from an average of operational conditions 220.

B11. Trim system 300 of any one of paragraph B7-B9, wherein trim controller 310 is operable to repeat selecting initial elevator orientation setting, determining initial stabilizer orientation setting, and comparing initial stabilizer orientation setting to operational conditions 220 until the initial elevator orientation setting is within a set threshold from neutral orientation 601 while initial stabilizer orientation setting is within operational conditions 220.

B12. Trim system 300 of any one of paragraph B1-B11, wherein trim controller 310 is operable to reduce elevator control bias in flight control system 350, if elevator orientation setting 315*b* is different from neutral orientation 601.

B13. Trim system 300 of any one of paragraph B1-B12, wherein flight control system 350 is a fly-by-wire system.

B14. Trim system 300 of any one of paragraph B1-B13, further comprising database 311, wherein trim controller 310 is operable to determine takeoff trim settings 315 is performed using database 311.

B15. Trim system 300 of any one of paragraph B1-B14, further comprising one or more sensors 380 for transmitting at least one of airplane takeoff parameters 105 to trim controller 310.

B16. Trim system 300 of any one of paragraph B1-B15, wherein one or more sensors of airplane 100 comprises a weight sensor installed in landing gear of airplane 100.

C1. Airplane 100 comprising:

a trim controller 310, operable to determine takeoff trim settings 315 of airplane 100 based on airplane takeoff parameters 105, wherein takeoff trim settings 315 comprise stabilizer orientation setting 315*a* and elevator orientation setting 315*b,* and wherein airplane takeoff parameters 105 comprise at least one parameter selected from one of an airplane weight, an airplane center of gravity, an airplane flap setting, or an airplane takeoff thrust setting;

a stabilizer orientation mechanism 112, controllable based on stabilizer orientation setting 315*a;* a stabilizer 110, mechanically coupled to stabilizer orientation mechanism 112, wherein stabilizer orientation mechanism 112 is operable to change orientation of stabilizer 110 based on stabilizer orientation setting 315*a;* an elevator orientation mechanism 122, controllable based on elevator orientation setting 315*b;* and an elevator 120, mechanically coupled to elevator orientation mechanism 122, wherein elevator orientation mechanism 122 is operable to change orientation of elevator 120 based on elevator orientation setting 315*b*.

C2. Airplane 100 of paragraph C1, wherein trim controller 310 is communicatively coupled to at least one of stabilizer orientation mechanism 112 or elevator orientation mechanism 122.

C3. Airplane 100 of any one paragraphs C1 and C2, wherein trim controller 310 is operable to receive elevator orientation setting 315*b* from flight controller 360 and to determine stabilizer orientation setting 315*a* based on elevator orientation setting 315*b* received from flight controller 360.

C4. Airplane 100 of any one paragraphs C1-C3, wherein elevator orientation setting 315*b* of takeoff trim settings 315 is different from to neutral orientation 601 of elevator 120.

C5. Airplane 100 of any one paragraphs C1-C4, wherein stabilizer orientation setting 315*a* and elevator orientation setting 315*b* of takeoff trim settings 315 are interdependent.

C6. Airplane 100 of any one paragraphs C1-C5, wherein trim controller 310 is operable to determine stabilizer orientation setting 315*a* based on elevator orientation setting 315*b*.

C7. Airplane 100 of paragraph C6, wherein trim controller 310 is operable to:

select an initial elevator orientation setting;

determine an initial stabilizer orientation setting based on initial elevator orientation setting;

compare initial stabilizer orientation setting to operational conditions 220;

select initial elevator orientation setting as elevator orientation setting 315*b* and initial stabilizer orientation setting as stabilizer orientation setting 315*a*.

C8. Airplane 100 of paragraph C7, wherein the initial elevator orientation setting is takeoff limit 602*a* of elevator takeoff sub-range 602, elevator takeoff sub-range 602 being portion of elevator total operating range 600, elevator total operating range 600 further comprising one or more flight control margins 604, elevator takeoff sub-range 602 is set based on flight control aspects of elevator 120.

C9. Airplane 100 of paragraph C7, wherein the initial elevator orientation setting is neutral orientation 601 of elevator 120.

C10. Airplane 100 of any one of paragraph C7-C9, wherein trim controller 310 is operable to repeat selecting initial elevator orientation setting, determining initial stabilizer orientation setting, and comparing initial stabilizer orientation setting to operational conditions 220 until the initial stabilizer orientation setting is within a set threshold from an average of operational conditions 220.

C11. Airplane 100 of any one of paragraph C7-C9, wherein trim controller 310 is operable to repeat selecting initial elevator orientation setting, determining initial stabilizer orientation setting, and comparing initial stabilizer orientation setting to operational conditions 220 until the initial elevator orientation setting is within a set threshold from neutral orientation 601 while initial stabilizer orientation setting is within operational conditions 220.

C12. Airplane 100 of any one of paragraph C1-C11, wherein trim controller 310 is operable to reduce elevator control bias in flight control system 350, if elevator orientation setting 315*b* is different from neutral orientation 601.

C13. Airplane 100 of any one of paragraph C1-C12, wherein flight control system 350 is a fly-by-wire system.

C14. Airplane 100 of any one of paragraph C1-C13, further comprising database 311, wherein trim controller 310 is operable to determine takeoff trim settings 315 is performed using database 311.

C15. Airplane 100 of any one of paragraph C1-C14, further comprising one or more sensors 380 for transmitting at least one of airplane takeoff parameters 105 to trim controller 310.

C16. Airplane 100 of any one of paragraph C1-C15, wherein one or more sensors of airplane 100 comprises a weight sensor installed in landing gear of airplane 100.

What is claimed is:

1. A method of controlling a trim system of an airplane, the method comprising:
    determining takeoff trim settings based on airplane takeoff parameters,
        wherein the takeoff trim settings comprise a stabilizer orientation setting and an elevator orientation setting,
        wherein the airplane takeoff parameters comprise at least one parameter selected from one of an airplane weight, an airplane center of gravity, a takeoff flap setting, or a takeoff thrust setting,
        wherein an elevator of the airplane has an elevator total operating range that is a first range and an elevator takeoff sub-range that is limited to a second range less than the first range,
        wherein the elevator orientation setting comprises an angle selected from within the elevator takeoff sub-range, and
        wherein the elevator orientation setting of the takeoff trim settings is different from a neutral orientation of the elevator in preparation for takeoff of the airplane and while the airplane is stationary;
    adjusting orientation of a stabilizer of the airplane using a stabilizer orientation mechanism of the airplane in accordance with the stabilizer orientation setting of the takeoff trim settings; and
    adjusting orientation of the elevator of the airplane using an elevator orientation mechanism of the airplane in accordance with the elevator orientation setting of the takeoff trim settings.

2. The method of claim 1, wherein the stabilizer orientation setting and the elevator orientation setting of the takeoff trim settings are interdependent.

3. The method of claim 2, wherein determining the takeoff trim settings comprises determining the stabilizer orientation setting based on the elevator orientation setting.

4. The method of claim 3, wherein determining the stabilizer orientation setting based on the elevator orientation setting comprises:
    selecting an initial elevator orientation setting;
    determining an initial stabilizer orientation setting based on the initial elevator orientation setting;
    comparing the initial stabilizer orientation setting to operational conditions; and
    selecting the initial elevator orientation setting as the elevator orientation setting and the initial stabilizer orientation setting as the stabilizer orientation setting.

5. The method of claim 4, wherein the initial elevator orientation setting is a takeoff limit of the elevator takeoff sub-range, wherein the elevator total operating range further comprises one or more flight control margins, and wherein the elevator takeoff sub-range is based on flight control aspects of the elevator.

6. The method of claim 4, wherein the initial elevator orientation setting is a neutral orientation of the elevator.

7. The method of claim 4, wherein selecting the initial elevator orientation setting, determining the initial stabilizer orientation setting; and comparing the initial stabilizer orientation setting to the operational conditions are repeated until the initial stabilizer orientation setting is within a set threshold from an average of the operational conditions.

8. The method of claim 4, wherein selecting the initial elevator orientation setting, determining the initial stabilizer orientation setting, and comparing the initial stabilizer orientation setting to the operational conditions are repeated until the initial elevator orientation setting is within a set threshold from a neutral orientation while the initial stabilizer orientation setting is within the operational conditions.

9. The method of claim 1, further comprising, if the elevator orientation setting is different from a neutral orientation, reducing elevator control bias in a flight control system.

10. The method of claim 9, wherein the flight control system is a fly-by-wire system.

11. The method of claim 1, wherein determining the takeoff trim settings is performed using a database.

12. The method of claim 1, further comprising initiating the takeoff of the airplane with the orientation of the stabilizer in accordance with the stabilizer orientation setting and with the orientation of the elevator in accordance with the elevator orientation setting.

13. The method of claim 12, further comprising changing the orientation of the stabilizer after the takeoff until a neutral control point of a flight control system corresponds to a neutral orientation of the elevator.

14. The method of claim 1, further comprising receiving the airplane takeoff parameters.

15. The method of claim 14, wherein at least one of the airplane takeoff parameters is received from a sensor of the airplane.

16. The method of claim 15, wherein the sensor of the airplane comprises a weight sensor installed in a landing gear of the airplane.

17. A trim system of an airplane, the trim system comprising:
- a trim controller, operable to determine takeoff trim settings of the airplane based on airplane takeoff parameters,
  - wherein the takeoff trim settings comprise a stabilizer orientation setting and an elevator orientation setting,
  - wherein the airplane takeoff parameters comprise at least one parameter selected from one of an airplane weight, an airplane center of gravity, an airplane flap setting, or an airplane takeoff thrust setting,
  - wherein an elevator of the airplane has an elevator total operating range that is a first range and an elevator takeoff sub-range that is limited to a second range less than the first range,
  - wherein the elevator orientation setting comprises an angle selected from within the elevator takeoff sub-range, and
  - wherein the elevator orientation setting of the takeoff trim settings is different from a neutral orientation of the elevator in preparation for takeoff of the airplane and while the airplane is stationary;
- a stabilizer orientation mechanism, controllable based on the stabilizer orientation setting;
- a stabilizer, mechanically coupled to the stabilizer orientation mechanism,
  - wherein the stabilizer orientation mechanism is operable to change orientation of the stabilizer based on the stabilizer orientation setting;
- an elevator orientation mechanism, controllable based on the elevator orientation setting; and
- an elevator, mechanically coupled to the elevator orientation mechanism,
  - wherein the elevator orientation mechanism is operable to change orientation of the elevator based on the elevator orientation setting.

18. The trim system of claim 17, wherein the trim controller is communicatively coupled to at least one of the stabilizer orientation mechanism or the elevator orientation mechanism.

19. The trim system of claim 17, wherein the trim controller is operable to receive the elevator orientation setting from a flight controller and to determine the stabilizer orientation setting based on the elevator orientation setting received from the flight controller.

20. The trim system of claim 17, wherein the stabilizer orientation setting and the elevator orientation setting of the takeoff trim settings are interdependent.

* * * * *